B. M. BESKOW & C. S. KELLOGG.
TRACTION WHEEL.
APPLICATION FILED MAY 19, 1914.
1,235,642.
Patented Aug. 7, 1917.
3 SHEETS—SHEET 1.
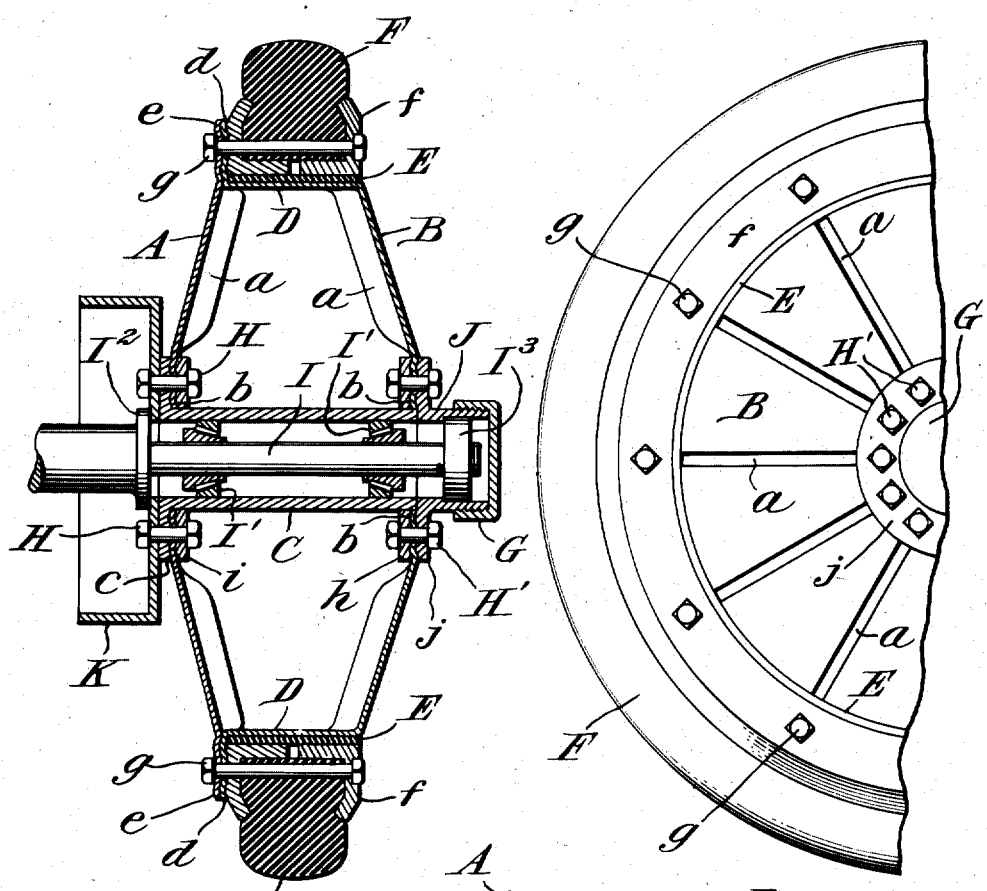

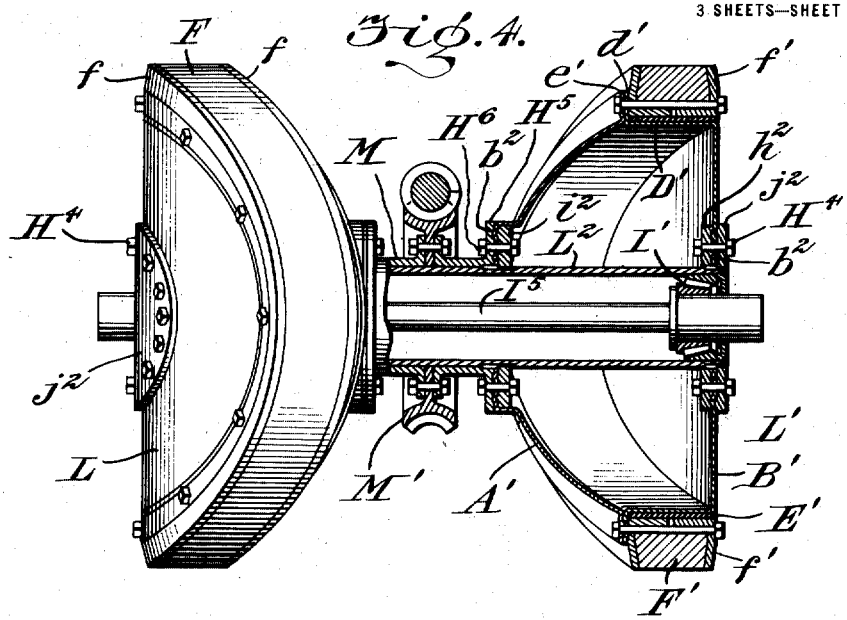
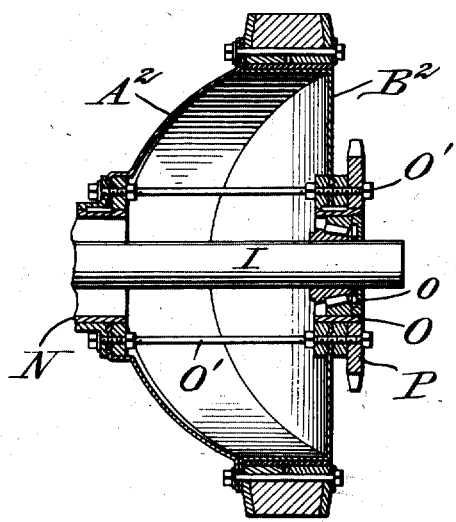
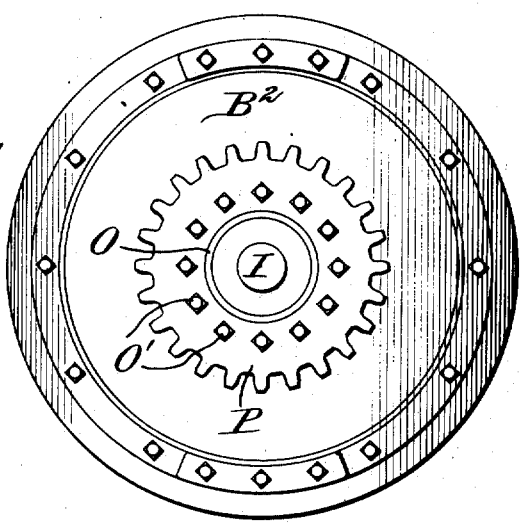

B. M. BESKOW & C. S. KELLOGG.
TRACTION WHEEL.
APPLICATION FILED MAY 19, 1914.
1,235,642.
Patented Aug. 7, 1917.
3 SHEETS—SHEET 3.
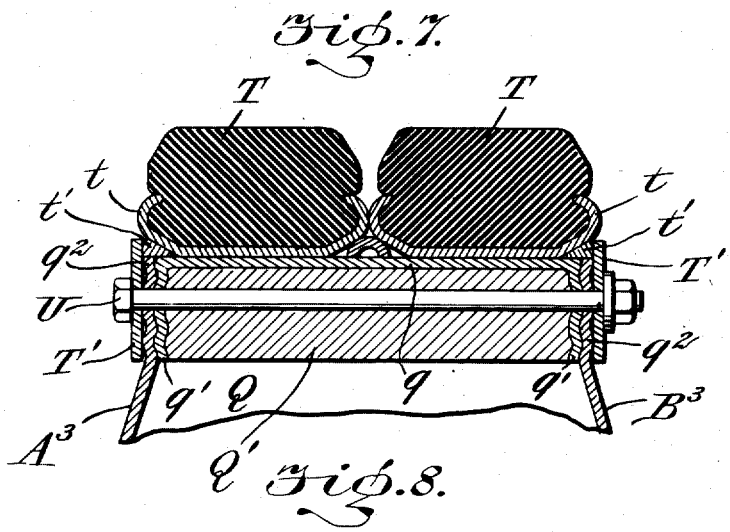
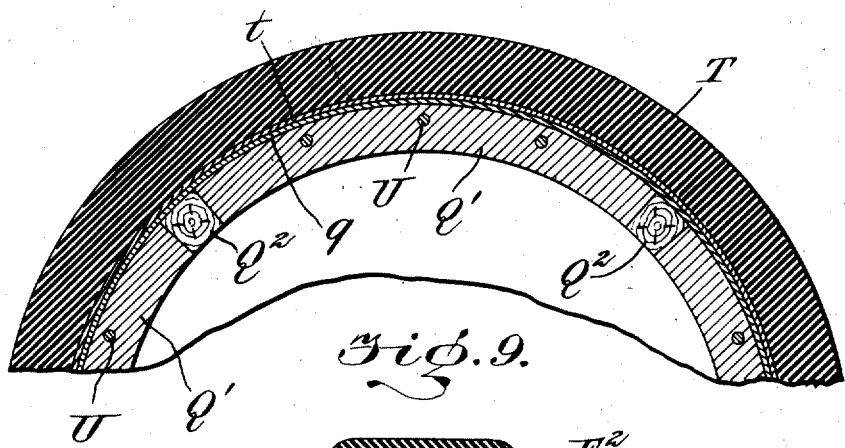
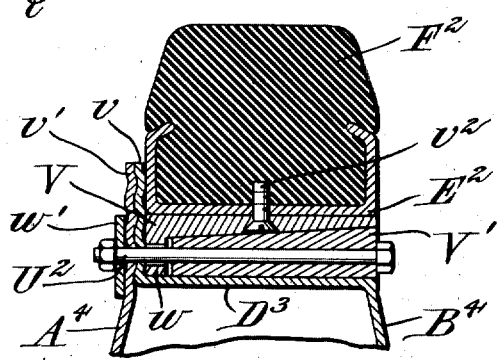
WITNESSES
O. C. Abbott
M. C. Rodriguez
INVENTORS
Bernhard M. Beskow and
Charles Snow Kellogg
BY
Edson Bernhard
ATTORNEYS

UNITED STATES PATENT OFFICE.

BERNHARD M. BESKOW AND CHARLES S. KELLOGG, OF NEW YORK, N. Y.

TRACTION-WHEEL.

1,235,642.

Specification of Letters Patent.

Patented Aug. 7, 1917.

Application filed May 19, 1914. Serial No. 839,476.

*To all whom it may concern:*

Be it known that we, BERNHARD M. BESKOW, a citizen of the United States, residing at the city of New York, borough of Queens, county of Queens, and State of New York, and CHARLES S. KELLOGG, also a citizen of the United States, residing at the city of New York, borough of Manhattan, county and State of New York, have invented a certain new and useful Traction-Wheel, of which the following is a specification.

This invention is a wheel for vehicles generally, and it pertains more particularly, to a wheel for motor driven vehicles, such as trucks, although the improved wheel may be used to good advantage on automobiles or pleasure cars.

A salient feature of the invention is a wheel composed of sheet metal side members and a demountable rim wherein the wheel structure is such that the rim can be removed without dismounting or otherwise disturbing the component parts of said structure.

Another important part of the invention is a metal wheel embodying complemental side members composed of pressed metal, corrugated to impart the required stiffness and stability to the wheel. The use of pressed sheet metal simplifies the wheel structure, enables the wheel to be manufactured rapidly and economically, and withal attains the required strength and stability.

An important structural feature of the wheel is an offset on one side member positioned to produce a rim seat or felly and flanged to secure an interlocking engagement with the companion side member. The rim seat is flanged at one edge to afford a stop or obstruction for the demountable rim, but the other edge of the rim seat or felly is free or unobstructed, whereby the demountable rim and the tire thereon can be easily taken off and replaced while at the same time the side members of said wheel remain intact.

The invention may be utilized in the construction of straight wheels for automobiles and vehicles generally, but a special feature of the invention pertains to the construction of a double wheel each half or member of which is composed of side plates relatively positioned to produce a sinuous rim or tread, the sinuosities of the two halves being reversed. Such a double wheel structure is desirable more especially for trucks, tractors and similar vehicles designed for the transportation of heavy loads, because of the fact that side slip on the road surface is minimized. The double wheel is valuable, moreover, in other relations, such as the driving or traction element of that type of light fast moving conveyance known as cycle cars.

Other features and advantages of the invention will appear from the following detailed description.

In the drawings,

Figure 1 is a vertical section of a sheet metal wheel with a demountable rim embodying our invention.

Fig. 2 is a side elevation of one-half of the wheel illustrated in Fig. 1.

Fig. 3 is a vertical section through the hub portion of a sheet metal wheel illustrating another hub construction.

Fig. 4 is an elevation, partly in vertical section, of a double sinuous tread wheel embodying the invention.

Fig. 5 is a vertical section through one-half of the double wheel with a sinuous tread illustrating a modified construction of the hub.

Fig. 6 is a side elevation of the construction illustrated in Fig. 5.

Fig. 7 is a cross section through the rim portion of a sheet metal wheel with a permanent rim interlocked to the side plates, a demountable double tire being seated upon the rim.

Fig. 8 is a transverse vertical section through the construction of Fig. 7.

Fig. 9 is a vertical section through the rim portion of a wheel with another form of means for securing the demountable tire thereto.

Referring more particularly to the construction illustrated in Figs. 1 and 2, the wheel embodies side plates A B each composed of a single piece of metal which is corrugated radially at *a* to impart the desired stiffness and rigidity to said member. The metal or sheet is cut to the desired form and dimensions and subjected to the pressure of suitable dies in a forming press, which dies operate to produce radial corrugations *a* and simultaneously therewith to impart the desired dished form to the member. As shown, the members are slightly conical, and said members are assembled in reverse positions, the corrugations being positioned interiorly or on the opposing faces of the members. The members A B are separate from each other, each being provided with a central opening, and each member having the metal around the opening corrugated circumferentially, as indicated at $b$, whereby the central portions of the members are adapted to be interlocked with a hub C. to be presently described.

An essential feature of the wheel construction is a felly D which is integral with one of the side plates and has interlocking engagement with the other side plate, and upon this felly is mounted a rim E, the latter carrying a tire F of one form or another, said tire being either solid or inflatable, as desired. As shown in Fig. 1 the side member B is turned over at its edge portion substantially at a right angle to the plane of said member B, thus resulting in the felly member D which is positioned to span the space between members A and B. The felly member D is provided with a corrugated flange $d$, and the edge portion of member A is corrugated at $e$, the corrugations $d\ e$ being similar or matching so that the edge portion of side member A is interlocked with the flange $d$ of felly member D. The flange $d$ and the edge portion of member A project radially beyond the felly member D and the outer edge of member B so that the parts $d\ e$ constitute a stop for the demountable rim when the latter is placed upon the wheel, but the side of the felly next to the member B is unobstructed whereby the rim and the tire thereon may be freely dismounted or replaced.

As shown, the rim E consists of a flat band of metal adapted to be mounted upon the felly of the wheel by moving said rim edgewise, thus shoving the rim and tire into position upon the felly. The tire F is connected with the rim by clamping members $f$, and the rim and tire when positioned upon the felly are adapted to be fastened in place by any suitable means. It is evident that devices well known to those skilled in the art may be employed for retaining the rim and tire in a locked position upon the wheel, but in Fig. 1 we have shown a bolt $g$ as the fastening means, said bolt extending through the corrugated interlocked parts $d\ e$, the clamps $f$ and a part of tire F.

Various forms of hub constructions may be employed, two of such forms being illustrated in Figs. 1 and 3. As shown in Fig. 1, the hub C is a sleeve provided at one end with an integral collar $c$, the ends of the hub sleeve being open. Near the other end of the hub sleeve is a collar $h$ which is fixed thereto in any suitable way, the outer end of the hub sleeve being externally threaded for the reception of a cap G. The corrugated part $b$ on the central portion of disk A is retained between the integral collar $c$ and another collar $i$, the opposing faces of said collars $c\ i$ being corrugated correspondingly to the part $b$ of the side member A, whereby the matching parts $b\ c\ i$ are adapted to be clamped or fastened together in any suitable way, as for example by the bolts or rivets H.

I designates an axle extending through the hub sleeve and supported by ball or roller bearings within said hub sleeve. Said axle is shown as having a collar $I^2$ and a dust collar $I^3$. The outer portion of the axle and its collar $I^3$ are incased within a boxing J forming a part of the sleeve C and upon the externally threaded part of which is screwed the cap G. Said boxing J is provided with a radial flange which is in opposing relation to the collar $h$ of the hub sleeve, and between the collar $h$ and flange J is positioned the corrugated part $b$ of side member B. The inner faces of collar $h$ and flange J are corrugated correspondingly to the corrugations $b$ of member B, and these parts are clamped in fixed relation by the bolts or rivets H'. It will be seen that the respective side members A B are interlocked with collars on the hub, said side members being rigidly fastened to, as well as interlocked with, members of said hub. The side members are, furthermore, connected at their outer edges by a felly member which is integral with one side member and is interlocked with the other side member, and thus all the parts of the wheel will remain connected firmly together when the rim and the tire are dismounted.

When the wheel shown in Fig. 1 is used as a part of a motor-driven vehicle, it may be provided with any suitable accessory, such as the brake drum K. As shown, this drum is applied laterally to the integral collar $c$ of the hub, and it is fastened in position upon the wheel by bolts H.

In Fig. 3 of the drawings there is illustrated another constructional form of the hub, wherein the hub sleeve C' is exteriorly threaded at one end and is expanded at the other end, as at $c'$. This expanded end of the hub is engaged by a corrugated collar $H^2$ with which coöperates a similar collar $i'$, between which collars $H^2\ i'$ is positioned the inner corrugated edge portion $b$ of side member A. Secured to the hub sleeve C' within the threaded part thereof is a fixed collar $h'$ with which coöperates another collar $j'$, and between the two collars is fitted the corrugated edge portion of the side member B. The collars and the side members are secured together by bolts or rivets $H^3$, and a brake drum K is secured to the side member A by the bolts $H^3$ which fasten said side member to the collars $H^2\ i'$.

A spacing sleeve $C^2$ is positioned on the hub sleeve C, the end portions of said spacing sleeve engaging with collars H² i' for preventing any inward movement of the collars and the side members.

In Figs. 4, 5 and 6 of the drawings there are illustrated other embodiments of the invention wherein the wheel consists of two members or halves provided with sinuous treads. In the construction of Fig. 4 the respective parts of the wheel are indicated at L L', and these parts are united or joined by a central hub or sleeve L², the respective end portions of which are connected rigidly to the halves of the wheel. Each half consists of side plates A' B' composed of pressed metal, each plate being bent to a certain curvature, the bent plates being positioned reversely to each other so that the part of the wheel makes the appearance illustrated in Fig. 4. The member A' is provided at its edge with corrugations, as at e', and the hub or central part of this member A' is offset and provided with a corrugated flange b². The other side member B' is bent at its edge to form the felly section D', the latter extending at right angles to the plate B', and the free edge of said felly section D' being bent upwardly and corrugated to produce the flange d'. The middle portion of the plate B' is corrugated, as at b², and said corrugated metal parts b² of the plates A' B' are attached rigidly to the hub sleeve L². As shown, the hub sleeve L² is provided near its end with collars j² h², said collars having corrugated faces for engagement with the corrugated portion b² of side member B', the whole being firmly secured together by bolts or rivets H⁴. The other side member A' is secured between corrugated collars i² H⁵ by bolts H⁶, said collar H⁵ being a part of a clamp M, the main purpose of which is to fasten a worm gear M' rigidly to the hub sleeve. The axle I⁵ passes through the hub sleeve L² so as to have ball-bearing engagement at I' with the respective end portions of said hub sleeve. Each half of the wheel is provided with a demountable rim E', said rim being provided with clamps f' by which a tire F' is attached to the rim E' so as to be demountable with the rim and to be replaceable with said rim as desired.

It is to be noted that each half of the wheel shown in Fig. 4 embodies the generic features of the invention disclosed in Figs. 1, 2 and 3, that is to say, each half consists of plates, one of which is provided with a bent edge to serve as a felly; that the felly member of one plate is interlocked with the flanged edge of the other plate, that a demountable rim is positioned on the felly member and in abutting engagement with the interlocked edges of the plates, whereby the rim and tire may be dismounted by withdrawing the same laterally from the felly member and that the hub portions of the respective side members have interlocking engagement with a hub construction of one form or another.

The construction illustrated in Figs. 5 and 6 is substantially the same as in Fig. 4, the distinction between the two constructions being the use of a short hub sleeve N through which extends an axle. The side plate A² is fastened by collars to the hub sleeve, whereas the companion side plate B² is fastened by collars to a short sleeve O, the latter being provided with a ball-bearing o for the outer end of the axle I. The side plates A² B² are fastened to their collars by a single set of through bolts O', the latter operating to attach a driving sprocket P to the outer face of the side member B² of one half of the wheel.

In Figs. 7 and 8 of the drawings there is shown a further embodiment of the invention, wherein the side members A³ B³ are separate from the rim Q and have interlocking engagement therewith. The rim shown is channeled consisting of a felly member q and depending flanges q', the latter being corrugated more or less and having interlocking engagement with the corrugated parts q² of the side members. On the felly member q of the channeled rim is positioned a metallic part t of a tire T, the latter being shown in Fig. 7 as a double tire adapted to be held in position by wedge members t' and clamping plates T'. As shown, bolts U pass through the clamping plates, the side plates and the flanges of the rim, for the purpose of binding the parts solidly together, said clamping plates acting on the wedge plates t' for binding the tire firmly in position upon the felly.

We may employ a channeled rim Q which is open interiorly, but it is preferred to employ a filling within said channeled rim, said filling consisting of segments of suitable material Q'. The segments are wedged tightly in position by the wedges Q² inserted between the adjacent ends of said segments, and these segments are, furthermore, fastened in place by the through bolts U.

In the construction of Fig. 9 the demountable rim E² and tire F² are retained in position upon the felly member D³ by coöperating wedge plates V V'. The felly member D³ is integral with one side member B⁴ of the wheel, said felly member being provided with a corrugated flange v which is corrugated for interlocking engagement with a similar corrugated flange v' forming a part of the side member A⁴. The wedge plate V is fastened to the demountable rim E² by a screw bolt v², and this wedge member is provided with a depending flange w having an aperture through which is adapted to pass the bolt U². The wedge plate V is thus attached to the demountable rim so as to be removable and replaceable therewith, and this wedge plate V coöperates with the companion wedge V', the latter being seated upon the wheel felly D³ and secured in position by the through bolt U². This bolt acts against a washer or side plate w' and when the bolt is removed the pressure of wedge V' is slackened so that the rim tire and wedge plate V may be dismounted without interrupting the interlocking engagement between the flanges v v' of the respective side plates A⁴ B⁴.

Although we have shown and described the side members of the wheel as having corrugations to secure the desired interlocking engagement, it is apparent to those skilled in the art that various equivalent constructions may be employed to effect the interlocking connection between said side members.

Having thus fully described the invention, what we claim as new and desire to secure by Letters Patent is:

1. A traction wheel comprising opposed side members forming spoke webs, a cylindrical rim seat rigid with one of said members, an outstanding flange on the rim seat interfitting with a coöperating radial flange on the other member to form an abutment for a rim, a clamping member resting on the rim seat, and means passed through the clamping member and through said interfitting flanges.

2. A traction wheel comprising opposed side members forming spoke webs, a cylindrical rim seat rigid with one of said members, a corrugated outstanding flange on the rim seat interfitting with a coöperating corrugated radial flange on the other member to form an abutment for a rim, a clamping member resting on the rim seat, and means passed through the clamping member and through said interfitting flanges.

3. A traction wheel embodying opposed disks forming spoke webs, each disk being of pressed metal with an outstanding corrugated flange, said disks being positioned reversely one to the other and the corrugations of the flanges interfitting, one of said disks having a lateral portion forming a rim seat, and means passed through the interfitting flanges for locking a rim detachably upon said seat.

4. A traction wheel embodying opposed disks forming spoke webs and having interfitting corrugated outstanding flanges, means passed through said flanges for holding tire-engaging means, a hub sleeve and means securing the same to said disks.

5. A traction wheel embodying opposed disks forming spoke webs and having interfitting corrugated outstanding flanges, means passed through said flanges for holding tire-engaging means, a hub sleeve, means securing the same to said disks, and a driving sprocket attached to one of said disks by the hub sleeve fastening means.

In testimony whereof we have signed our names to this specification in the presence of two subscribing witnesses.

BERNHARD M. BESKOW.
CHARLES S. KELLOGG.

Witnesses:
 M. C. RODRIGUEZ,
 H. I. BERNHARD.